Oct. 8, 1963 E. HARRIMAN 3,106,101
SPLIT SPROCKET
Filed Dec. 6, 1960 2 Sheets-Sheet 1
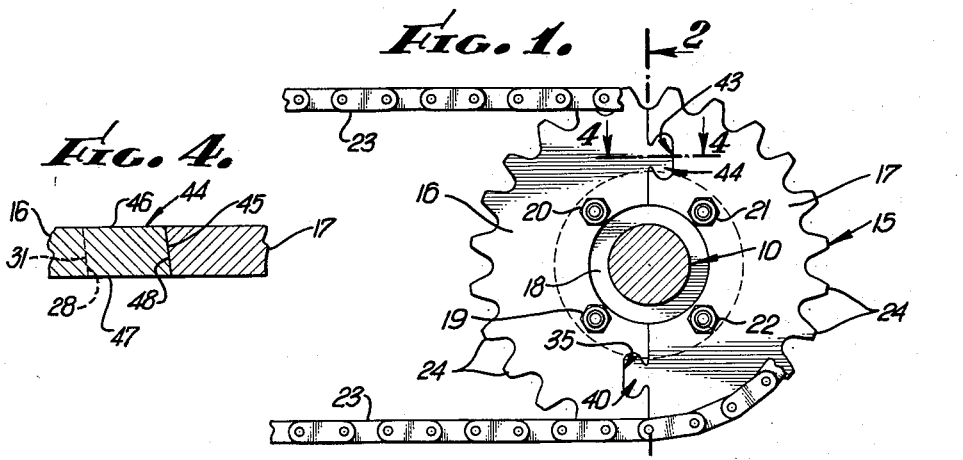
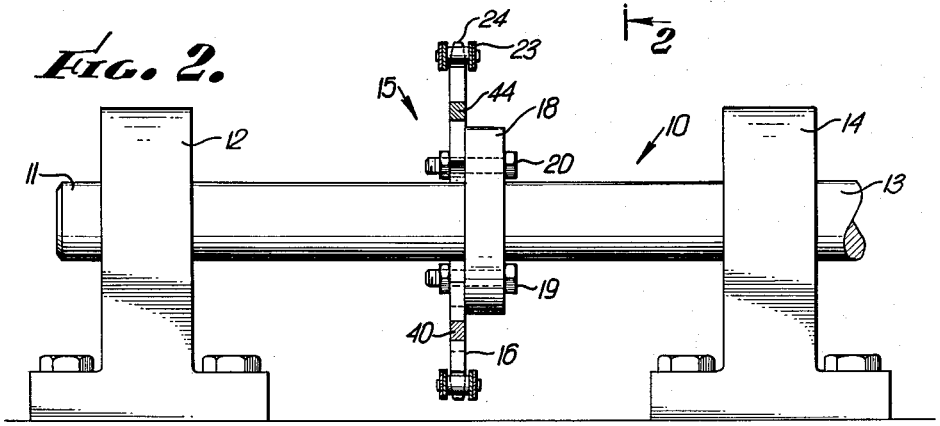
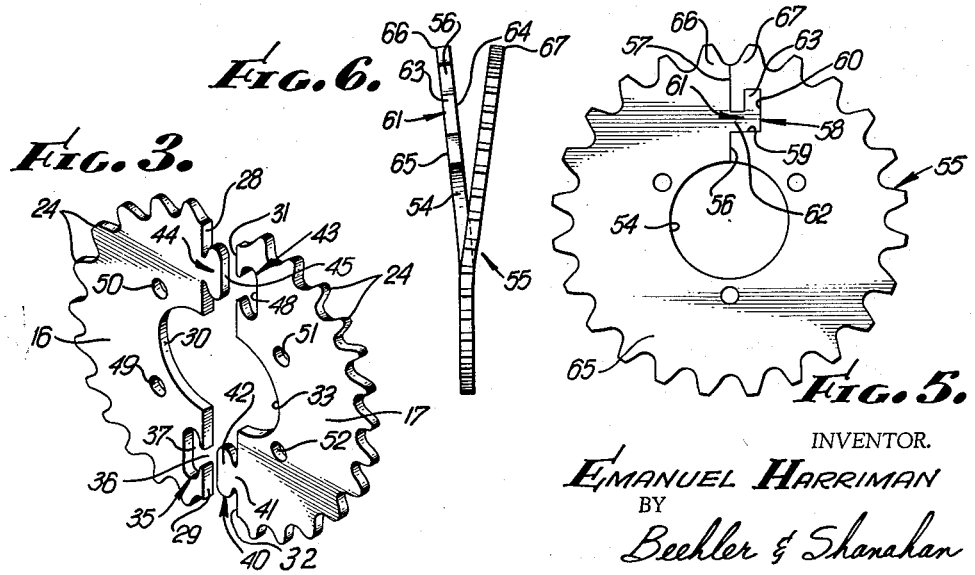
INVENTOR.
EMANUEL HARRIMAN
BY
Beehler & Shanahan
ATTORNEYS.

Oct. 8, 1963   E. HARRIMAN   3,106,101
SPLIT SPROCKET
Filed Dec. 6, 1960   2 Sheets-Sheet 2
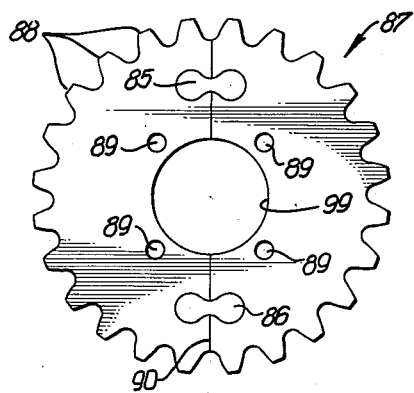
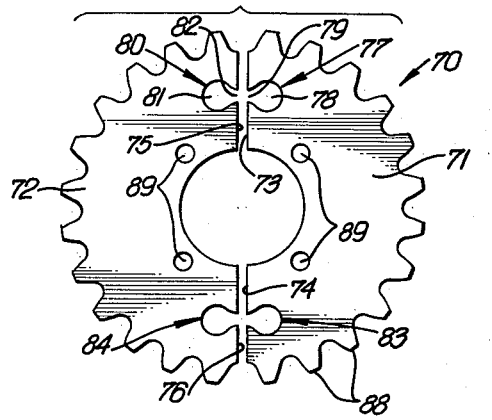
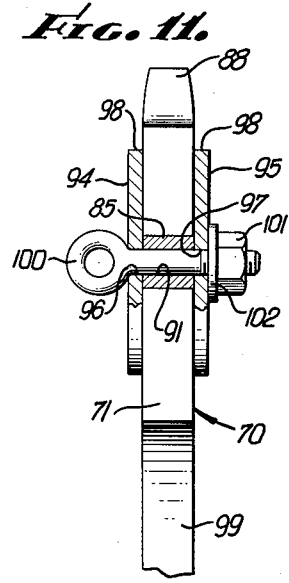
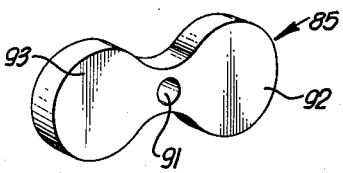
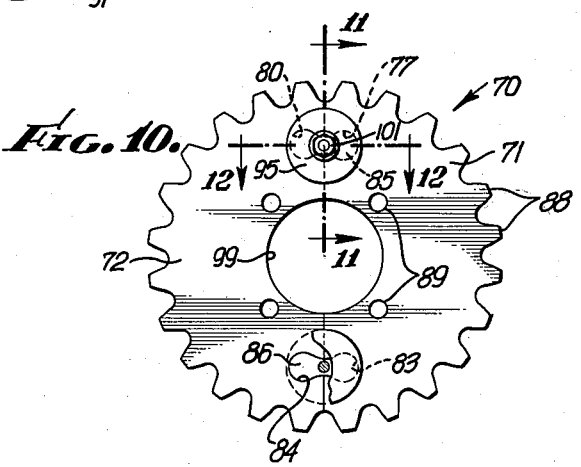
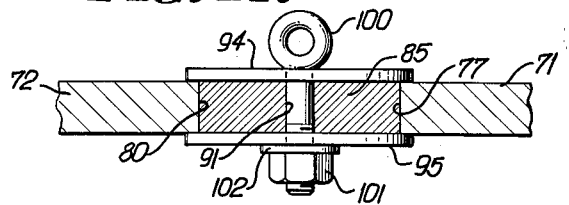
INVENTOR.
EMANUEL HARRIMAN
BY
Beehler & Shanahan
ATTORNEYS.

United States Patent Office 3,106,101
Patented Oct. 8, 1963

3,106,101
SPLIT SPROCKET
Emanuel Harriman, 2550 N. Merced,
South El Monte, Calif.
Filed Dec. 6, 1960, Ser. No. 74,123
1 Claim. (Cl. 74—243)

The invention has reference to drive and driven mechanisms and is concerned in particular with that portion of such a system, commonly identified as a sprocket, pulley or gear, which is customarily mounted for operation upon a shaft. More particularly, the invention is concerned with a type of sprocket, pulley or gear which is separable to the extent that it can be placed upon a shaft and dismounted therefrom without it being necessary to disengage the shaft from its customary mounting.

In the average machinery installation whether it be related to automotive vehicles, bicycles, or other sundry types of operating machinery, sprockets for either the driving portion of the machinery or the driven portion of the machinery are normally mounted upon a shaft under circumstances where the shaft in turn is fixed upon bearings at opposite ends, in order to make it readily rotatable. The common expedient employed when a sprocket is to be changed either because it is damaged or broken or for the purpose of replacing it with a sprocket of different diameter has been to dismount the shaft so as to withdraw the sprocket over one end or the other and then slide a new sprocket into place, with the attendant cost and expense of labor and an unnecessary amount of down time for the machinery.

Some attempts have been made to obviate the expedient herein made reference to by providing a sprocket split into one or more sections with the sections bolted together in some manner or other in the hope of providing a continuous sprocket which can be mounted upon and be removed from a shaft without removing the shaft from its bearings. The split sprockets heretofore employed, however, have not met the full requirements for dependable sprockets especially sprockets operated under heavy loads and at high speeds because the connecting means between the sections have not been such as to capably resist a tendency of the sections to separate both circumferentially and radially. For a sprocket to be dependable the resistance must be complete in both directions especially when the part is in operation with a belt, chain or gear operatively connected with it.

It is, therefore, among the objects of the invention to provide a new and improved split sprocket having separable sections of such character that it can be applied to and removed from the midportion of a continuous shaft, and which in operating adjustment provides ample resistance to separation both in a circumferential and in a diametrical direction.

Another object of the invention is to provide a new and improved split type sprocket capable of being applied to and removed from the midportion of a continuous shaft which includes interlocking elements consisting of configurations of the sprocket itself, capable of resisting both circumferential and diametrical displacement without the need for accessory attachment means.

Still another object of the invention is to provide a new and improved split type sprocket capable of being applied to and removed from the midportion of an endless shaft mounting which is so constructed that by virtue of the configuration of the sprocket itself, it is completely resistant to both circumferential and diametrical separation, and which at the same time is quick and easy to install and take off, which is applicable to virtually any size sprocket, and a shaft of virtually any relative size usable therewith and which may be adapted equally well to driving or being driven by a chain, belt or gear.

With these and other objects in view, the invention consists in the construction, arrangement and combination of the various parts of the device, whereby the objects contemplated are attained, as hereinafter, set forth, pointed out in the appended claims and illustrated in the accompanying drawings.

FIGURE 1 is a side elevational view of a split sprocket mounted upon a suitable shaft and provided with a chain drive;

FIGURE 2 is an end elevational view of the shaft mounting showing the sprocket thereon in section taken on the line 2—2 of FIGURE 1;

FIGURE 3 is an exploded perspective view of the sprocket of FIGURES 1 and 2;

FIGURE 4 is a fragmentary sectional view taken on the line 4—4 of FIGURE 1;

FIGURE 5 is an end elevational view of a modified form of sprocket;

FIGURE 6 is an edgewise elevational view of the sprocket of FIGURE 5 distorted to a degree preparatory to application over the midportion of an appropriate shaft.

FIGURE 7 is a side elevational view of a modified form of the invention showing the sprocket at a stage of its manufacture;

FIGURE 8 is a side elevational view of the completed sprocket of the modified form with the parts slightly separated;

FIGURE 9 is a perspective view of one of the plugs made use of in assembling the sprocket of FIGURE 8;

FIGURE 10 is a side elevational view of the modified form of sprocket completely assembled;

FIGURE 11 is a fragmentary transverse sectional view taken on the line 11—11 of FIGURE 10;

FIGURE 12 is a fragmentary sectional view taken at right angles to the view of FIGURE 11 on the line 12—12 of FIGURE 10.

In an embodiment of the invention chosen for illustration, there is shown primarily by way of example, a shaft 10 which may be considered as an endless shaft in that it is mounted at one end 11 in a bushing 12 and at another portion 13 in a corresponding bushing 14, thereby providing a portion of the shaft intermediate the bushings which is continuous. Applied to the shaft is a sprocket assembly 15 consisting in the embodiment made reference to of a section 16 and a complementary section 17. Although two sections only are shown, it will be appreciated that the sprocket assembly need not be strictly limited to two sections.

On the shaft 10 is a flange 18 which may, if desired, be fastened non-rotatably to the shaft. Bolts 19 and 20 fasten the section 16 to the flange 18 and bolts 21 and 22 fasten the section 17 thereto. A chain 23 is shown extending over teeth 24 of the sprocket.

On the section 16 of the sprocket is an edge surface 28 and a second edge surface 29 on opposite sides of a semi-circular hole 30 which is adapted to surround the corresponding portion of the shaft 10. Similarly, in the section 17 is an edge surface 31 opposite the edge surface 28 and a second edge surface 32 opposite the edge surface 29, the edge surfaces 31 and 32 being upon opposite sides of a semi-circular hole 33 which surrounds the other portion of the shaft 10.

In the edge surface 29 is a pocket indicated generally by the reference character 35. The pocket may be described as consisting of interconnecting parts 36 and 37, the part 36 forming the entrance to the pocket and presumptively extending in a somewhat generally circumferential direction, with the part 37 constituting the inner part of the pocket and extending somewhat generally in a diametric direction.

On the edge surface 32 is a projection indicated generally by the reference character 40 having a neck part 41 thereof corresponding to the part 36 of the pocket 35, and a part 42 corresponding substantially to the part 37 of the pocket. Similarly, in the edge surface 31 is a pocket 43 of substantially the same shape, size, and relative position as the pocket 35 which receives a projection 44 of similar shape, size, and disposition to the projection 40, such that the projection 44 is snugly received within the pocket 43 in the same manner that the projection 40 is snugly received in the pocket 35, as shown in FIGURE 1. Attention is further directed to the tapered relationship between the projection and the pocket in each instance as indicated in the fragmentary sectional view of FIGURE 4. As there shown, it will be noted that an edge 45 of the projection 44 slopes generally outwardly from a face 46 to a face 47 of the section 16. It should also be noted that the edge surface 28 slopes in a substantially similar direction. It will be understood from this that the entire perimetral edge 45 defining the outline of the projection 44 slopes outwardly to a corresponding degree on all sides. Conversely, a perimetral edge 48 of the pocket 43 slopes in a direction corresponding to the slope of the edge 45 so that it matches the edge precisely. The edge surface 31 in a similar fashion matches the slope of the edge surface 28. Substantially, the same relationship exists between the projection 40 and its corresponding pocket 35 and with respect to the edge surfaces 29 and 32.

When the sprocket assembly 15 is to be separated so that one of the sections 16 is removed from its engagement with the section 17 without dismounting the shaft 10, the bolts 19, 20, 21, and 22 are removed respectively from bolt holes 49, 50, 51, and 52. Next, the section 16 is forced transversely with respect to the section 17 so that, by making reference to FIGURE 4, the section 16 moves downwardly and the section 17 moves upwardly. This permits the projection 44 to be readily separated from the pocket 43. At the same time and by reason of the same general construction as already described, the projection 40 will be removed from its snug engagement with the pocket 35. When this has been completely accomplished, the sections 16 and 17, assuming the chain has been already removed, will be completely separated one from the other and can thereupon be lifted free from the shaft 10 and the flange 18.

When the sprocket assembly is to be reapplied, or when a similar type of sprocket assembly is to be substituted for the one just removed, opposite sections 16 and 17 thereof are placed in position one against the other with the semi-circular holes 31 and 33 surrounding the shaft and displaced one from the other axially by slightly more than the thickness of the sprocket materials. The sections are then engaged with each other by pressing the projections into the corresponding pocket in a direction substantially opposite to that described for the separating process, having reference to FIGURE 4 by way of example. After the sections have been forced into engagement with each other far enough so that the opposite surfaces are completely co-extensive, the sections are then re-bolted to the flange 18 by the appropriate bolts, and the sprocket is then firmly mounted in place, after which the chain 23 can be re-applied. Should the chain be tighter than might permit application after assembly of the sprocket assembly, the chain in fact can be placed around one of the sections, namely, the section 17, for example, when it is applied to one side of the shaft 10 whereafter the other section 16 can be forced into engagement with it, and when the parts are thus engaged the chain will already be in place. Following this operation, the bolts can be applied in the usual fashion. The reverse may also be true in disassembly on those occasions where the chain 23 cannot first be removed.

In the form of invention shown in FIGURE 6, a sprocket 55 is shown provided with only one split presenting edge surfaces 56 and 57. In the edge surface 57 is a pocket indicated generally by the reference character 58 and consisting of a part 59 extending transversely with respect to the edge surface, and a part 60 extending substantially parallel to the edge surface which is in effect a direction parallel to the diametrical disposition of the split. The split extends from a hole 54 to the circumference.

On the edge surface 56 is a projection indicated generally by the reference character 61 and consisting of a part 62 corresponding in size and location to the part 59 of the pocket, and a part 63 corresponding in size and relation to the part 60 of the pocket.

In this example also, the size of the projection 61 on one face 64 of the sprocket may be slightly smaller than the size of the projection on the opposite face 65 of the sprocket. In the chosen example, where the relative sizes at opposite faces of the pocket 58 will be reversed. When the sprocket 55 is to be separated so that it can be applied to or removed from a shaft like the shaft 10, the sprocket is sprung open by shifting an end section 66 transversely relative to an end section 67 in substantially the manner illustrated in FIGURE 6. In this manner the parts may be separated far enough to span the shaft. In applying and removing the split sprocket of the modified form of FIGURES 5 and 6, bolting and unbolting is performed in an appropriate sequence similar to that described in connection with FIGURES 1 through 4 inclusive in order to properly attach the sprocket in its assembled condition.

In both forms of the device due to the somewhat angular relationship between the parts of the pockets in one instance and the similar parts of the projection in the other instance, resistance will be supplied against separation both in a circumferential direction and in a diametrical direction. Because of the somewhat undercut relationship of the innermost portion of the pocket when the corresponding part of the projection lies within it, any stress in a somewhat circumferential direction will press one part against the other and anchor them against separation. Similarly, because of the somewhat transverse positioning of the opening of the pocket at the corresponding edge surface and the corresponding positioning of the projection which fits within it, the projection will resist in shear any tendency for the parts to separate in a diametrical direction, and the combination of both is especially effective. This resistance holds true whether there be only one pocket and corresponding projection, as shown in connection with FIGURE 5, or whether there be two or more such pockets and projections arranged in substantially the relationship shown and described in connection with FIGURES 1 through 4, inclusive.

In the modified form of invention shown in FIGURES 7 through 12, inclusive, the sprocket 70, as evidenced by FIGURES 8 and 10, consists of two identical parts 71 and 72. The part 71, for example, is a semi-circle and is provided with edge surfaces 73 and 74 which face corresponding edge surfaces 75 and 76 on the part 72. In the edge surface 73 is a pocket 77, this pocket having an enlarged inner part 78 which may be said to extend roughly in a diametrical direction and is provided further with an outer or entrance part 79, the axis of which extends roughly in a circumferential direction. A pocket 80 in the sprocket part 72 is similarly provided with an inner part 81 and an outer part 82. These pockets are the complement of each other, although this is a convenience primarily in having the opposite parts 71 and 72 interchangeable since the precise conformity of shape of the pockets 77 and 80 is not strictly essential.

Similarly in the edge surface 74 is a pocket 83, while in the edge surface 76 is a corresponding complementary pocket 84, these pockets having the same arrangement of parts as the pockets 77 and 80.

In order to form the pockets and provide plugs 85 and 86 to fit them precisely, as a convenience the parts 71 and 72 of the sprocket 70 initially comprise a single blank indicated generally by the reference character 87. This is the form of the sprocket in an initial stage of manufacture with teeth 88 of the conventional sort cut in the edge and holes 89 punched therethrough for ultimate mounting of the sprocket in the manner heretofore described in connection with the first described forms of the invention. The plugs 85 and 86 are punched out by a conventional punch-pressing operation by use of proper dies and hence are precisely the size of the holes formed by the punching-out process, these holes ultimately becoming pockets 77 and 80 on one side of the sprocket and pockets 83 and 84 on the other side. Good practice suggests that the plugs be tumbled after being punched out to remove about one one-thousandth of an inch from the outer circumference so that they can be more easily slid into the pockets when the sprocket is to be assembled. After the plugs have been punched out, the blank 87 is cut along a diametrical line 90 into two identical halves, the cut thus described forming the edge surfaces 73, 74, 75 and 76 already made reference to.

After the plugs 85 and 86 have been punched out, each plug has a hole 91 drilled through it substantially at the location shown in FIGURE 9 which is more or less central with respect to opposite sections 92 and 93 of the plug.

To assemble the parts 71 and 72 of the sprocket, they are brought together into the positions illustrated in FIGURE 10 and the plugs 85 and 86 are then inserted in the respective pairs of pockets 77, 80 and 83, 84. The repositioning of the plugs in the pockets alone is sufficient to lock in the concentricity and prevent the sprocket from pulling apart. In view, however, of the fact that the plugs are not wedged into position, assurance needs to be provided against the possibility of the plugs dropping out. To accomplish this there are employed two washers 94 and 95 having holes 96 and 97, respectively, therethrough. The circumferences 98 of the washers must be larger than at least a portion of the respective plugs so that portions of the washer will overlie portions of the parts 71 and 72 immediately adjacent the pockets. A screw 100 of any acceptable form is then passed through the holes 96 and 97 in the respective washers and the hole 91 in the plug and a nut 101 and lock washer 102 are applied and tightened into position, thereby to draw the washers against opposite sides of the sprocket and confine the plugs 85 and 86, respectively, in position, as illustrated in FIGURES 10, 11 and 12. When this operation is completed, there will be a central hole 99 for reception of the shaft (not shown) when the sprocket is mounted on it.

When the sprocket is to be applied to a shaft, the parts 71 and 72 are moved into position against opposite sides of the shaft and the plugs anchored in place as described immediately above. When the sprocket is to be removed from the shaft, the nut and screw in each instance is removed, the washers then removed, and the respective plugs are pushed out of the pockets. This, as is obvious from the description, completely frees one part of the sprocket from the other and they can be readily lifted from the shaft. Replacement, of course, follows the procedure clearly defined above.

It will be clear from the description that the relative shapes and locations of the pockets and projections are primarily instrumental in interlocking opposite sections of the sprocket together in the desired relationship and that irrespective of the drive, be it a chain, belt or gear, the same resistance persists to separation, and that this resistance is at its fullest without necessity for accessory attachment means other than the material of the sprocket itself. Because of this simple interconnection, the sections are easily separated when the sprocket is to be removed from the shaft without in any way disturbing the shaft mounting, and can be reapplied with equal ease.

While the invention has herein been shown and described in what is conceived to be the most practical and preferred embodiment, it is recognized that departures may be made therefrom within the scope of the invention, which is not to be limited to the details disclosed herein but is to be accorded the full scope of the claim so as to embrace any and all equivalent devices.

Having described the invention, what is claimed as new in support of Letters Patent is:

A sprocket for application to a shaft, and having a hole therethrough adapted to surround said shaft, said sprocket comprising a resilient material, a single split extending from the hole to the circumference providing a pair of complementary matching edge surfaces between adjacent end sections of the sprocket, one of said pair of matching edge surfaces having a pocket therein having interconnecting parts with one of said parts extending in a direction substantially diametrically and the other of said parts extending in a direction substantially transversely to said one part, the other of said matching edge surfaces having a projection with interconnecting parts thereof complementary in shape and size to the interconnected parts of the pocket and releasably wedged in said pocket in assembled condition on the shaft whereby to resist separation in both a circumferential and diametrical direction, said matching edge surfaces being separable transversely, said resilient material of the sprocket being yieldable upon separation of said matching edge surfaces transversely a distance greater than the diameter of the shaft whereby said sprocket when in separated condition can alternatively be removed from and applied to the shaft at a location intermediate the ends thereof.

References Cited in the file of this patent

UNITED STATES PATENTS

| | | |
|---|---|---|
| 1,120,202 | Jones | Dec. 8, 1914 |
| 1,391,719 | Conyngham | Sept. 27, 1921 |
| 2,683,380 | Hutton | July 13, 1954 |
| 2,913,915 | Russ | Nov. 25, 1959 |